United States Patent [19]

Fritschel

[11] Patent Number: 4,487,902

[45] Date of Patent: Dec. 11, 1984

[54] POLYMER OF TFE AND F-ALKYL ETHYLENE

[75] Inventor: Scott J. Fritschel, Wilmington, Del.

[73] Assignee: E. I. Du Pont de Nemours and Company, Wilmington, Del.

[21] Appl. No.: 507,082

[22] Filed: Jun. 23, 1983

Related U.S. Application Data

[63] Continuation-in-part of Ser. No. 289,493, Aug. 6, 1981, abandoned, which is a continuation-in-part of Ser. No. 190,562, Sep. 25, 1980, abandoned.

[51] Int. Cl.³ .................. C08F 14/26; C08F 14/18
[52] U.S. Cl. .................................. 526/253; 526/255
[58] Field of Search ................................ 526/253, 255

[56] References Cited

U.S. PATENT DOCUMENTS

| | | | |
|---|---|---|---|
| 2,919,263 | 12/1959 | Kahrs et al. | 526/249 |
| 3,804,817 | 4/1974 | Wall et al. | 526/249 |
| 4,035,565 | 7/1977 | Apotheker et al. | 526/249 |

OTHER PUBLICATIONS

J. Polymer Science 8, pp. 2441–2452 (1970).
Scott James Fritschel Declaration.
Dr. Bernhard Wunderlich Declaration.

*Primary Examiner*—Christopher A. Henderson

[57] ABSTRACT

Copolymers of tetrafluoroethylene and fluorinated alkyl ethylenes are obtained by this invention in which units of the copolymer derived from the ethylene comonomer are substantially uniformly positioned along the copolymer chain.

2 Claims, No Drawings

POLYMER OF TFE AND F-ALKYL ETHYLENE

CROSS REFERENCE TO RELATED CASES

This application is a continuation-in-part of application Ser. No. 289,493 filed Aug. 6, 1981 now abandoned which is a continuation-in-part of application Ser. No. 190,562, filed Sept. 25, 1980, now abandoned.

FIELD OF THE INVENTION

This invention relates to polymers of tetrafluoroethylene, and more specifically to copolymers of tetrafluoroethylene and fluorinated alkyl ethylenes.

BACKGROUND OF THE INVENTION

A number of copolymers of tetrafluoroethylene are known, but new copolymers of tetrafluoroethylene are always of interest due to a desire to obtain polymers having improved properties over polymers known heretofore.

U.S. Pat. No. 4,123,602 to H. Ukihashi, et al., relates to tetrafluoroethylene/ethylene copolymers modified with 0.1 to 10 mol. % $R_fCH=CH_2$ where $R_f$ is $C_nF_{2n+1}$ in which n is an integer between 2 and 10. These polymers contain between 40 and 60 mol % ethylene. The thermal instability against oxidation limits their use above 150° C. for extended periods of time.

U.S. Pat. No. 3,804,817 to L. A. Wall and D. W. Brown describes copolymers of (perfluoropropyl)ethylene (PFPE) and tetrafluoroethylene (TFE), and copolymers of (perfluoroethyl)ethylene and tetrafluoroethylene (See column 2, lines 16–26. These copolymers are elastomeric, soluble in fluorinated solvents, and possess only modest thermal stability as evidenced by the thermal gravimetric analysis (TGA) data shown in the patent. In J. Poly. Sci. 8, 2441(1970) the patentees reproduce Table 1 of the U.S. Pat. No. 3,804,817 and in the article describe that the copolymers of TFE and PFPE containing up to 89 mol % TFE are amorphous by X-ray diffraction measurement. The polymers appear amorphous on testing by differential scanning calorimetry (DSC) techniques.

Also disclosed in U.S. Pat. No. 3,804,817 is a TFE copolymer containing about 6 mol % PFPE, in Example 4. This copolymer has the following properties:

1. The melting behavior by DSC is essentially identical to PTFE. It is well known (Polymer Handbook, Vol. 2, pV-32, (1975)) that polytetrafluoroethylene (PTFE) has a reproducible melting point at 327° C. and occasionally contains phases which exhibit higher melting points on the initial heating cycle. The higher melting point can be as high as 342° C. The 94/6 copolymer of U.S. Pat. No. 3,804,817 Example 4 exhibits both of these melting points and no lower melting points which would correspond to crystalline copolymer phases.

2. Thermal stability of the melt at 350° C., i.e., approximately 20° C. above the melting point, as measured by isothermal TGA in air, is low. A weight loss of 8.7% was seen at 140 minutes.

3. A small-angle X-ray scattering scan does not show the broad diffraction peak at low angles ($2\theta$ below 1°) normally seen for crystalline TFE copolymers. The 94/6 copolymer of U.S. Pat. No. 3,804,817 Example 4 instead shows the steady increase in intensity with decreasing angle that is shown by homopolymer PTFE.

Based on these results, the copolymer of U.S. Pat. No. 3,804,817 Example 4 is believed to be composed mostly of a fraction of crystalline TFE homopolymer with a minor fraction of amorphous TFE/PFPE copolymer with high PFPE content. It is well known that crystalline TFE homopolymer cannot be processed by melt techniques, and that mixtures of PTFE with melt processable copolymers lead to the formation of high local concentrations of PTFE, or "fisheyes", in finished parts which are undesirable. In extreme cases, the presence of PTFE in a melt processable copolymer can greatly lower the strength of a finished article. The objective of copolymerizing small amounts, e.g. 1–10 mol % of comonomer, with TFE is to produce copolymers with homogenous, readily processable melts in which the melting point has been lowered from that of PTFE. U.S. Pat. No. 3,804,817 does not teach how to achieve this objective.

SUMMARY OF THE INVENTION

Copolymers of tetrafluoroethylene and fluorinated alkyl ethylenes are obtained by this invention in which units of the copolymer derived from the ethylene comonomer are substantially uniformly positioned along the copolymer chain. This positioning results in insoluble copolymers which when molded are nonelastomeric and exhibit good thermal stability.

In contrast to the copolymers of U.S. Pat. No. 3,804,817, especially the "94/6 copolymer" of Example 4, the copolymer of this invention exhibit the following properties:

1. DSC melting points are substantially below that of PTFE and are in the range expected for true random copolymers. The melting points are usually between 260 and 318° C.

2. Thermal stability by isothermal TGA in air is good. These measurements were made at 350° C., i.e. between 30° and 90° C. above the melting points of these polymers. The weight loss in less than 5% at 140 minutes and is frequently 1% or less.

3. Small angle X-ray scattering (SAXS) scans show a diffraction peak at very low angles (less than $1°2\theta$), normally seen for semicrystalline copolymers of TFE.

Thus the term "substantially uniformly positioned" means that the copolymers meet the following conditions: DSC melting point is below about 318° C., the thermal stability is such that the weight loss after 140 minutes at 350° C. in air is less than 5%, and the small angle X-ray scattering scan shows a diffraction peak at angles below 1° $2\theta$.

By "insoluble" is meant that the copolymer does not dissolve in organic solvents maintained at 25° C.

By "nonelastomeric" is meant that the molded copolymer is not a material which at room temperature can be stretched repeatedly to at least twice its original length and, upon immediate release of the stress, will return with force to its approximate original length.

The copolymers of this invention can more specifically be described as copolymers of 93–99 mol % tetrafluoroethylene, and complementarily 7–1 mol % fluorinated alkyl ethylene comonomers of the formula $R_fCH=CH_2$ wherein $R_f$ is perfluorinated alkyl of 2–10 carbon atoms or substituted perfluorinated alkyl of 2–10 carbon atoms in which the perfluorinated alkyl can be substituted with up to three hydrogen atoms, said copolymer characterized by having the units of the comonomer substantially uniformly positioned, i.e., evenly distributed, throughout the copolymer chain.

The process aspect of the invention can be described as a process for preparing the copolymer described above which comprises (a) combining and agitating tetrafluoroethylene and the fluorinated alkyl ethylene in the presence of a nonaqueous solvent or in aqueous media in a rection vessel at a temperature of between 30° C. and 110° C. and a pressure of between 1 kg/cm² and 70 kg/cm² and preferably between 3 kg/cm² and 35 kg/cm², in the presence of a free-radical polymerization initiator, said combining of the tetrafluoroethylene and fluorinated alkyl ethylene being carried out by continuously and uniformly adding fluorinated alkyl ethylene to the reaction vessel in a manner which maintains a concentration of fluorinated alkyl ethylene in the vessel during agitation below 2.5 mol %, and preferably below 1 mol %, relative to tetrafluoroethylene, said agitation being continued until copolymer formation has occured, and (b) separating the copolymer from the other ingredients present in step (a).

DESCRIPTION OF THE INVENTION

The copolymer of this invention is obtained by copolymerizing tetrafluoroethylene and fluorinated alkyl ethylene in either a nonaqueous solvent or in an aqueous medium in a manner which maintains the concentration of the fluorinated alkyl ethylene in the reaction mixture at a relatively constant and low concentration compared to the concentration of tetrafluoroethylene. If a large concentration, i.e., over 2.5 mol %, of perfluoroalkyl ethylene is employed, the polymerization reaction is inhibited, and uniform copolymer is not obtained.

As nonaqueous solvents in the polymerization, fluoro- or chlorofluoro-hydrocarbon, (preferably 1 to 4, and especially 1 to 2, carbon atoms) known as a "Freon" solvent or solvents similar thereto are useful. Suitable "Freon" solvents or solvents similar thereto include: dichlorodifluoromethane, trichloromonofluoromethane, dichloromonofluoromethane, monochlorodifluoromethane, chlorotrifluoromethane, tetrafluoroethane, trichlorotrifluoroethane, dichloroetrafluoroethane, fluorochloropropane, perfluoropropane, fluorocyclobutane, perfluorocyclobutane, etc. or mixtures thereof. It is best to use a saturated fluoro- or chlorofluoro-hydrocarbon which does not have a hydrogen atom in the molecule, such as dichlorodifluoromethane, trichloromonofluromethane, trichlorotrifluoroethane, dichlorotetrafluoroethane, perfluorocyclobutane, etc., since such solvents have a tendency of increasing the molecular weight of the resulting copolymer. When a "Freon" solvent or a like solvent is used, good results are attainable when used in amounts of 0.5–20 mol and especially about 1–10 mol of the solvent per mol of monomer mixture of tetrafluoroethylene and perfluoroalkylethylene monomer.

The copolymerization reaction can be carried out by using less than 0.5 mol of the solvent per mol of monomer mixture. However, it is advantageous to use more than 1 mol of solvent in order to enhance the rate of the copolymerization. It is possible to use more than 20 mols of solvent, but it is advantageous to use less than 10 mols per mol of monomer mixture for economic reasons, such as solvent recovery.

A mixture of a "Freon" solvent or like solvent and other organic solvents or aqueous medium may be used. For example, it is possible to use a mixed reaction medium of "Freon" solvent or like solvent and water.

The advantage of using such a mixed solvent consists in easy stirring of the reaction system and easy removal of the heat of reaction. In accordance with the process of the invention, the conditions of the copolymerization can be varied depending upon the type of polymerization initiator or the reaction medium.

A wide variety of polymerization initiators can be used depending upon the polymerization system. However, when a "Freon" solvent or solvent similar thereto is used, it is preferable to use a soluble free-radical polymerization initiator, such as an organic peroxy compound. It is possible to use high energy ionizing radiation of 10–10⁵ rad/hour dose rate. Suitable peroxy compounds may be the organic peroxides, e.g., benzoylperoxide or lauroylperoxide; peresters, e.g., t-butyl peroxyisobutyrate; or peroxy dicarbonates, e.g., diisopropylperoxy dicarbonate, etc. It is especially prefered to use as the initiator in non-aqueous systems, a peroxide having the formula

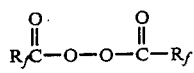

wherein $R_f$ each represent perfluoroalkyl groups containing from 3–13 carbon atoms, in a "Freon" solvent or like solvent. Suitable such peroxides include bis(perfluoropropionyl) peroxide, bis(perfluorohexanoyl) peroxide, etc.

When the solvent system is an aqueous system, initiators such as peroxides or persulfates which are compatible with water should be used, such as disuccinoyl peroxide or ammonium persulfate. In an aqueous system, a non-telogenic dispersing agent is commonly employed.

The polymerization can be carried out at a temperature of between 30° and 110° C., and preferably at a temperature of between 40° and 80° C. Pressures employed in the polymerization are ordinarily those pressures between 1 and 70 kg/cm² and preferably are those between 3 and 35 kg/cm².

It is often preferable to include a small amount of a telogenic material in the reaction medium in order to control the molecular weight of the resulting copolymer. Alcohols such as methanol or ethanol, and alkanes such as ethane, butane, cyclohexane, etc. are suitable telogens.

The mixture of comonomers is agitated during polymerization.

The reaction may be carried out until solids content of the reaction mixture reaches about 20% by weight for aqueous reactions, and about 12% for nonaqueous solvent based reactions.

It is important to control the concentration of the fluorinated alkyl ethylene in the reaction mix as heretofore described, and to maintain the concentration at a relatively constant level. Both these features result in copolymers in which the units of fluorinated alkyl ethylene present are substantially evenly distributed along the copolymer chain.

Representative comonomers include perfluoroethyl ethylene and perfluorodecyl ethylene. Preferably the comonomer will be a perfluorobutyl ethylene.

The copolymers are useful as insulation coating for electrical wires and as linings for equipment exposed to harsh chemical environments.

EXAMPLES

The following examples, apparent melt viscosity was determined by calculations based on the melt flow rate. The melt flow rate was determined according to ASTM procedure D2116 at a load of 5000 g except that the melt flow rate was determined in grams/minutes rather than grams/10 minutes. The equation used to calculate the apparent melt viscosity was:

$$MV = \frac{10.63 \times [\text{Total mass piston \& weight (g)}]}{\text{melt flow rate}}$$

Melting point was determined by differential scanning calorimetry at a rate of 15° C. per minute.

Ultimate elongation, yield strength and ultimate tensile strength were determined by ASTM procedure D1708.

Thermal stability was determined by isothermal thermogravimetric analysis (TGA) at 350° C. in air using a Du Pont 900 instrument.

Solubility of the polymers prepared in the Examples was determined at 25° C. in a number of common organic solvents including hexafluorobenzene, acetone, and 1,1,2-trichloro-1,2,2-trifluoroethane. The polymers were insoluble.

X-ray scattering data was obtained with a Kratky diffractometer (Anton Kaar, K.G., Graz, Austria) operating digitally in an off-line mode. The X-ray intensities were detected with a scintillation counter followed by a single-channel pulse-height analyzer set to pass 90% of CuK radiation symmetrically. The X-ray beam was filtered with 0.02 mm Ni foil and the sample thickness was in the range 0.3 to 0.4 mm. The raw data (X-ray counts, time, position) were recorded on 8-channel punched paper tape and read into an IBM 1130 computer. X-ray intensities were calculated as the ratio of counts to time, and these results were smoothed and corrected for sample thickness and instrumental background. The resultant corrected intensities were plotted as log-intensity vs. diffraction angle (2-$\theta$). The results were not corrected for slit-smearing since such a correction would not aid significantly in distinguishing among samples containing a discrete small-angle peak and those not containing it.

The comonomer content of the tetrafluoroethylene perfluorobutyl ethylene copolymers was determined either by an infrared method or by a melting point method.

The infrared method involves measuring the intensity of absorption bands at 2360 cm$^{-1}$ and 1355 cm$^{-1}$ in compression molded film. The band at 2360 cm$^{-1}$ is used to determine the thickness of the film using the equation $$\text{Thickness (mils)} = (Abs._{2360\ cm^{-1}}) \frac{1\ \text{mil}}{(0.081\ Abs)}.$$

The comonomer concentration can then be calculated using the following equation:

$$\text{Concentration (g/cm}^3\text{)} = \frac{Abs_{1355}}{\left(340 \frac{Abs\ cm^2}{g}\right)(\text{Thickness(cm)})}$$

This equation provides the comonomer concentration in g/cm$^3$. Knowing the density of the polymer allows conversion to weight percent by the following equation:

$$\frac{\text{Concentration (g/cc)}}{2.15(\text{Density, g/cc})} \times 100 = \text{weight \% comonomer}$$

The absorbance factor used in this calculation (340 Abs cm$^2$/g) was determined by standard methods using a homopolymer of perfluorobutyl ethylene in "Freon" F-113 solvent.

The results obtained by the infrared method agreed well with those obtained through the use of melting point data and the following equation:

$$\frac{1}{T_M} - \frac{1}{T_{TFE}} = \frac{-1.98}{685} (\ln N_{TFE})$$

where $T_M$ = melting point of the copolymer in °K
$T_{TFE}$ = melting point of homopolymer PTFE (600° K)
$N_{TFE}$ = mole fraction TFE in the copolymer This equation was found to agree well with the results obtained from the infrared method for polymers containing up to 5 mol % perfluorobutyl ethylene.

EXAMPLE 1

Into an evacuated, agitated 1 liter stainless steel autoclave were placed 800 ml of 1,1,2-trichloro-1,2,2-trifluoroethane solvent and 2 ml of perfluorobutyl ethylene. The temperature of the mixture was raised to 60° C. and the agitator speed was set at about 1000 rpm. To this mixture was charged tetrafluoroethylene to a total pressure of 9.1 kg/cm$^2$. To the autoclave was then charged 15 ml of a solution of 0.002 g/ml bisperfluoropropionyl peroxide in the aforementioned solvent. The pressure was kept constant by the continuous addition of tetrafluoroethylene. After 10 minutes, the above mentioned peroxide solution was fed into the reactor at a rate of 1 ml/min as was a solution of 0.04 g/ml of perfluorobutylethylene in 1,1,2-trichloro-1,2,2-trifluoroethane also at 1ml/min. This rate maintained a concentration of perfluorobutyl ethylene of less than about 1.1 mol % based on total monomers. The polymerization was continued for a total of 70 minutes at which time the contents of the autoclave were discharged into a large stainless steel beaker. The polymer was recovered by drying in an air oven at 150° C. for several hours. The dry polymer weighed 74 g. The polymer exhibited a sharp melting point at 315° C. with a small shoulder at 287° C. The apparent melt viscosity was too high to measure. The polymer could be compression molded into tough films. Comonomer content was 1.1 mol %. Isothermal TGA in air at 350° C. showed at 4.8% weight loss at 140 minutes. X-ray scattering data showed a diffraction peak at angels below 1°$\theta$.

EXAMPLE 2

Into an evacuated, agitated 1 liter stainless steel autoclave were placed 800 ml 1,1,2-trichloro-1,2,2-trifluoroethane solvent, 2 ml of perfluorobutylethylene, and 0.25 ml of methanol. The temperature of the mixture was raised to 60° C. and the agitator speed was set at about 1000 rpm. To this mixture was charged tetrafluoroethylene to raise the total pressure to 9.1 kg/cm$^2$. To the autoclave was then charged 15 ml of a solution of 0.002 g/ml bis-perfluoropropionyl peroxide in the above mentioned solvent. After 4 minutes, the peroxide solution was added continuously to the autoclave at a rate of 1 ml/min. After an additional 4 minutes, the addition of a solution of 0.04 g/ml perfluorobutylethylene in the same solvent was begun, also at a rate of 1 ml/min. This rate maintained perfluorobutyl ethylene at a concentration of less than about 1.1 mol %. The polymerization was allowed to continue for an additional 60 minutes at which time the contents of the autoclave were discharged into a large stainless steel beaker. The polymer was recovered by drying in an air oven at 150° C. for several hours. The dry polymer weighed 55.5 g and had an apparent melt viscosity at 372° C. of $27 \times 10^4$ poise. The polymer was compression molded into tough films. Comonomer content was 2.3 mol %. Melting point was 303° C. Isothermal TGA in air at 350° C. showed a weight loss of 1% at 140 minutes. X-ray data indicated a diffraction peak at angles less than $1°2\theta$.

Compression molded films prepared from the polymer described above were placed in a forced air oven and heat aged at 250° C. for 200 hours. The physical properties of the treated films were measured and are reported in Table 1.

TABLE 1

| PHYSICAL PROPERTIES OF FILMS | | |
|---|---|---|
| Test | Example 2 (As made) | Example 2 (Heat aged) |
| Ultimate Tensile Strength | | |
| 25° C. | 4200 psi | 3240 psi |
| 250° C. | 1480 | 1370 |
| Yield Strength | | |
| 25° C. | 2090 psi | 2190 psi |
| Ultimate Elongation | | |
| 25° C. | 290% | 250% |
| 250° C. | 610 | 600 |
| MIT folding endurance, cycles, 7-8 mil film ASTM D2176 | No failure after 1.3 MM cycles | No failure after 1.7 MM cycles |

EXAMPLE 3

Into an evacuated, agitated 1 liter stainless steel autoclave were placed 800 ml 1,1,2-trichloro-1,2,2-trifluoroethane solvent and 1.6 ml of perfluoropropyl ethylene. The temperature of the mixture was raised to 60° C. and the agitator speed was set at about 1000 rpm. To this mixture was charged tetrafluoroethylene to raise the total pressure to 9.1 kg/cm². To the autoclave was then charged 15 ml of 0.023 g/ml bis-perfluoropropionyl peroxide in the above-mentioned solvent. The peroxide delivery pump was then set to add the peroxide solution continuously to the autoclave at the rate of 1 ml/min. After 7 min, the addition of a solution of 0.04 g/ml of perfluoropropyl ethylene in the same solvent was begun, also at a rate of 1 ml/min. This rate maintained the perfluoropropyl ethylene at a concentration of less than about 1.1 mol %. Tetrafluoroethylene was added at such a rate as to keep the pressure in the autoclave constant. The polymerization was allowed to continue for an additional 60 minutes at which time the contents of the autoclave were discharged into a large stainless steel beaker. The polymer was recovered by drying in an air oven at 150° C. for several hours. The dry polymer weighed 48.4 g and exhibited sharp melting points by differential scanning calorimetry at 284 and 310° C. The apparent melt viscosity at 372° C. was too high to measure. The polymer could be compression molded into tough films. Comonomer content was 4.3 mol %. Isothermal TGA in air at 350° C. showed a weight loss of 0.9% at 140 minutes. X-ray scattering data showed a diffraction peak at angles less than $1° 2\theta$.

EXAMPLE 4

Into an evacuated, agitated 1 liter stainless steel autoclave were placed 800 ml 1,1,2-trichloro-1,2,2-trifluoroethane solvent, 1.0 ml 3,3,4,4-tetrafluorobutene-1 and 0.25 ml methanol. The temperature of the mixture was raised to 60° C. and the agitator speed was set at about 1000 rpm. To this mixture was charged tetrafluoroethylene to raise the total pressure to 9.1 kg/cm². To the autoclave was then charged 15 ml of 0.0023 g/ml bis-perfluoropropionyl peroxide in the above-mentioned solvent. The peroxide delivery pump was then set to add the peroxide solution continuously to the autoclave at a rate of 1 ml/min. After 15 minutes, the addition of a solution of 0.021 g/ml of 3,3,4,4-tetrafluorobutene-1 in the same solvent was begun, also at a rate of 1 ml/min. This rate maintained the tetrafluorobutene at a concentration of less than about 1.1 mol %. Tetrafluoroethylene was added at such a rate as to keep the pressure in the autoclave constant. The polymerization was allowed to proceed for an additional 60 minutes at which time the contents of the autoclave were discharged into a large stainless steel beaker. The polymer was recovered by drying in an air oven at 150° C. for several hours. The dry polymer weighed 32.1 g and exhibited a sharp melting point by differential scanning calorimetry at 291° C. with a small shoulder at 312° C. The melt viscosity at 372° C. was $0.62 \times 10^3$ Pa.s ($0.62 \times 10^4$ poise). Comonomer content was 3.6 mol %. Isothermal TGA in air at 350° C. showed a weight loss of 1.1% at 140 minutes. X-ray scattering data showed a diffraction peak at angles less than $1° 2\theta$.

COMPARISON

To show the effect of adding perfluorobutyl ethylene in one initial charge prior to initiating polymerization, the following experiment was carried out.

A 110 ml stainless steel shaker tube was charged with 50 ml 1,1,2-trichloro-1,2,2-trifluoroethane solvent, 0.74 g perfluorobutylethylene and 0.02 g of bis-perfluoropropionyl peroxide. The tube was cooled and evacuated and 10 g of tetrafluoroethylene was added. The tube was heated to 60° C. and shaken for 4 hrs. The product was isolated by drying in an air oven at 150° C. for several hours. The dry polymer obtained weighed 0.25 g (2.3%) and was highly swollen by 1,1,2-trichloro-1,2,2-trifluoroethane. The polymer could not be compression molded into films. The polymer showed no sharp crystalline melting peaks by differential scanning calorimetry between 220° and 350° C.

I claim:
1. A substantially pure copolymer consisting of:
93–99 mol % tetrafluoroethylene units, and complementally,
7–1 mol % fluorinated alkyl ethylene comonomer units of the formula

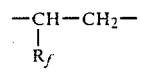

wherein $R_f$ is perfluorinated alkyl of 2–10 carbon atoms or substituted perfluorinated alkyl of 2–10 carbon atoms in which the perfluorinated alkyl can be substituted with up to three hydrogen atoms, said copolymer characterized by being semi-crystalline, by having the units of the comonomer substantially uniformly positioned throughout the copolymer chain, by having a sharp melting point below 315° C. as determined by Differential Scanning Calorimetry, by having a thermal stability such that the weight loss after 140 minutes at 350° C. in air is less than 5%, by having a small angle X-ray scattering scan which exhibits a peak below 1° 2, and by being nonelastomeric.

2. A copolymer of claim 1 wherein the fluorinated alkyl ethylene comonomer is perfluorobutyl ethylene.

* * * * *